THOMAS & MAST.

Seed Planter.

No. 3,210. Reissued Nov. 24, 1868.

N. PETERS. Photo-Lithographer, Washington, D. C.

UNITED STATES PATENT OFFICE.

J. H. THOMAS AND P. P. MAST, OF SPRINGFIELD, OHIO.

IMPROVEMENT IN SEED-PLANTERS.

Specification forming part of Letters Patent No. 21,034, dated July 27, 1858; Reissue No. 3,210, dated November 24, 1868.

*To all whom it may concern:*

Be it known that we, J. H. THOMAS and P. P. MAST, of Springfield, in the county of Clarke and State of Ohio, have invented certain new and useful Improvements in Machines for Sowing Grass-Seed; and we do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use our invention, we will proceed to describe it.

Our invention consists, first, in a novel construction of an apparatus for sowing grass-seed; second, in the combination of a grass-seed sower with a grain-drill in such a manner as to deposit the grass-seed in rear of the hoes or drill-tubes of the grain-drill; and, third, in a novel manner of constructing the hoppers of the combined machine.

Figure 1:
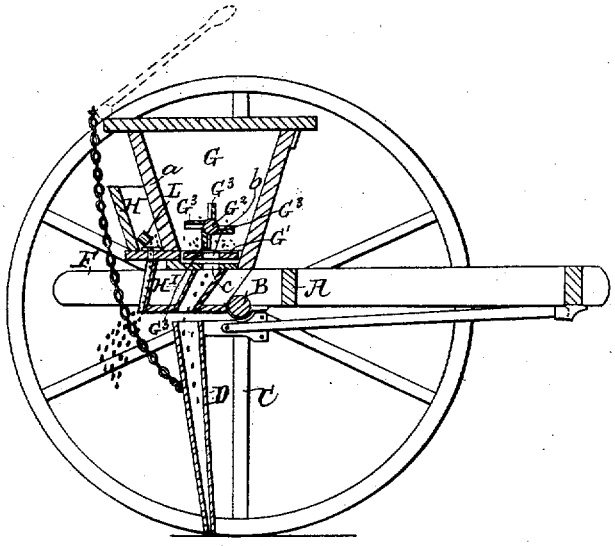
Figure 2:
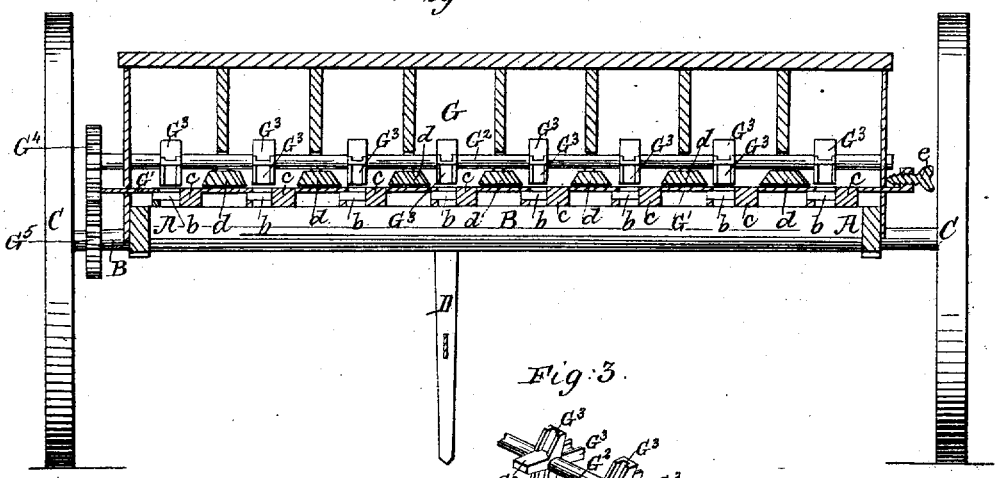
Figure 3:
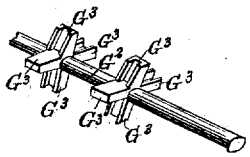

Figure 1 is a longitudinal vertical section of our combined machine. Fig. 2 is a transverse vertical section of the same, and Fig. 3 is a perspective view of the seed stirrers or agitators used in the wheat or grain hopper of our combined machine.

In the construction of machines of this character there have been two serious difficulties. First, the location of the grass-seed hopper has heretofore been such as to interfere with the devices used for elevating the drill-tubes; and, second, they have been so constructed that the grass-seed was delivered in front of the hoes or drill-tubes, the consequence of which was that many of the small seeds of the grass were covered so deeply as to prevent their germination. Thus not only was the seed itself wasted, but there was also a failure of the desired crop of grass.

In constructing our improved grass-seed sower we provide a narrow hopper, H, and locate it close behind the hopper of any suitable grain-drill, as represented in Fig. 1. The bottom of this hopper H has a series of small holes or perforations arranged centrally along it for the seed to fall through, and directly over these is placed a slide, *e*, having corresponding perforations, so that by adjusting this slide the flow of the seed may be regulated or cut off entirely, as may be desired.

Within the hopper H, and lengthwise thereof, we locate a square shaft or rod, I, journaled at its ends in the end pieces of the hopper H, so as to permit it to revolve, one end of the shaft I protruding through the end piece of the hopper, and having a pulley or gear wheel on it outside of the hopper for the purpose of receiving motion from the grain-drill, and thereby causing the shaft I to rotate and stir up the grass-seed and prevent it from clogging, and causing it to feed regularly and evenly through the perforations at the bottom, as represented in Fig. 1.

When constructed for use with the grain-drill invented by us, and described in our specification thereof of even date herewith, we use a spur-gear wheel on the shaft I, and arrange it to gear into the wheel $G^4$ on the shaft in the grain-hopper, which shaft and wheel are shown clearly in Fig. 2. In such case, also, we construct the hopper of the grain-drill proper with its rear side inclined, so as to permit the grass-seed hopper to be placed close to and partially under the rear side of the grain-hopper, and thus be out of the way of the chains or other devices used for elevating the drill-tubes, and at the same time deliver the grass-seed in rear of the drill-tubes or hoes, where it will fall and remain mostly upon the surface of the ground, and will thus escape being covered or buried by the earth raised by the hoes, as is the case in all machines where the grass-seed is deposited in front of the hoes or drill-tubes, as has hitherto been the practice.

In constructing our combined machine we make the end pieces of both the grain and the grass-seed hoppers at each end of a single piece preferably of a metallic plate, usually of iron, cast in the required form, and having lugs or flanges on it for bolting or screwing the bottom and sides of both hoppers to. By this means we are enabled to so construct the hoppers as to prevent them from warping out of shape and causing the slides to bind or stick fast or work imperfectly when exposed to the action of the weather, as this class of machines necessarily is more or less.

It is obvious that the grass-seed sower may be constructed separately and then mounted upon and used with any suitable grain-drill, in which case, of course, its hopper would have to be made complete of itself and independent of the grain-hopper. It may also be mounted upon a suitable frame of its own and used independent of the grain-drill in those cases where it is desired to sow the grass-seed at different or other times than that at which the grain is sown.

In all cases, whether intended for use separately or combined with the grain-drill, we secure to the under side of the hopper H a series of flaring inclined conductors or delivery-spouts, H′, which receive the grass-seed as it falls through the perforations in the hopper-bottom, and from the lower end of which it falls in an even sheet, and is thus spread broadcast evenly over the surface.

By these means we produce a grass-seed sower that is extremely simple and efficient, that can be used either with or without the grain-drill proper, and that can be so combined with a grain-drill as not to interfere with the manipulation of the latter, and also deliver the grass-seed in rear of the drill-tubes or hoes.

Having thus described our invention, what we claim is—

1. The combination of a grass-seed sower with a grain-seeder in such a manner as to distribute the grass-seed behind the tubes or hoes of the grain-seeder, substantially as described.

2. The combination of the grain-hopper G and the grass-seed hopper H, when constructed and arranged to operate substantially as and for the purpose set forth.

3. The combined hoppers G and H, having their ends at each side of the machine formed of a single plate, substantially as and for the purposes herein described.

J. H. THOMAS.
P. P. MAST.

Witnesses:
W. C. DODGE,
P. T. DODGE.